March 13, 1962  J. M. MEISETSCHLAGER  3,024,563
CASE FOR FISHING LINES
Filed Aug. 20, 1959  2 Sheets-Sheet 1
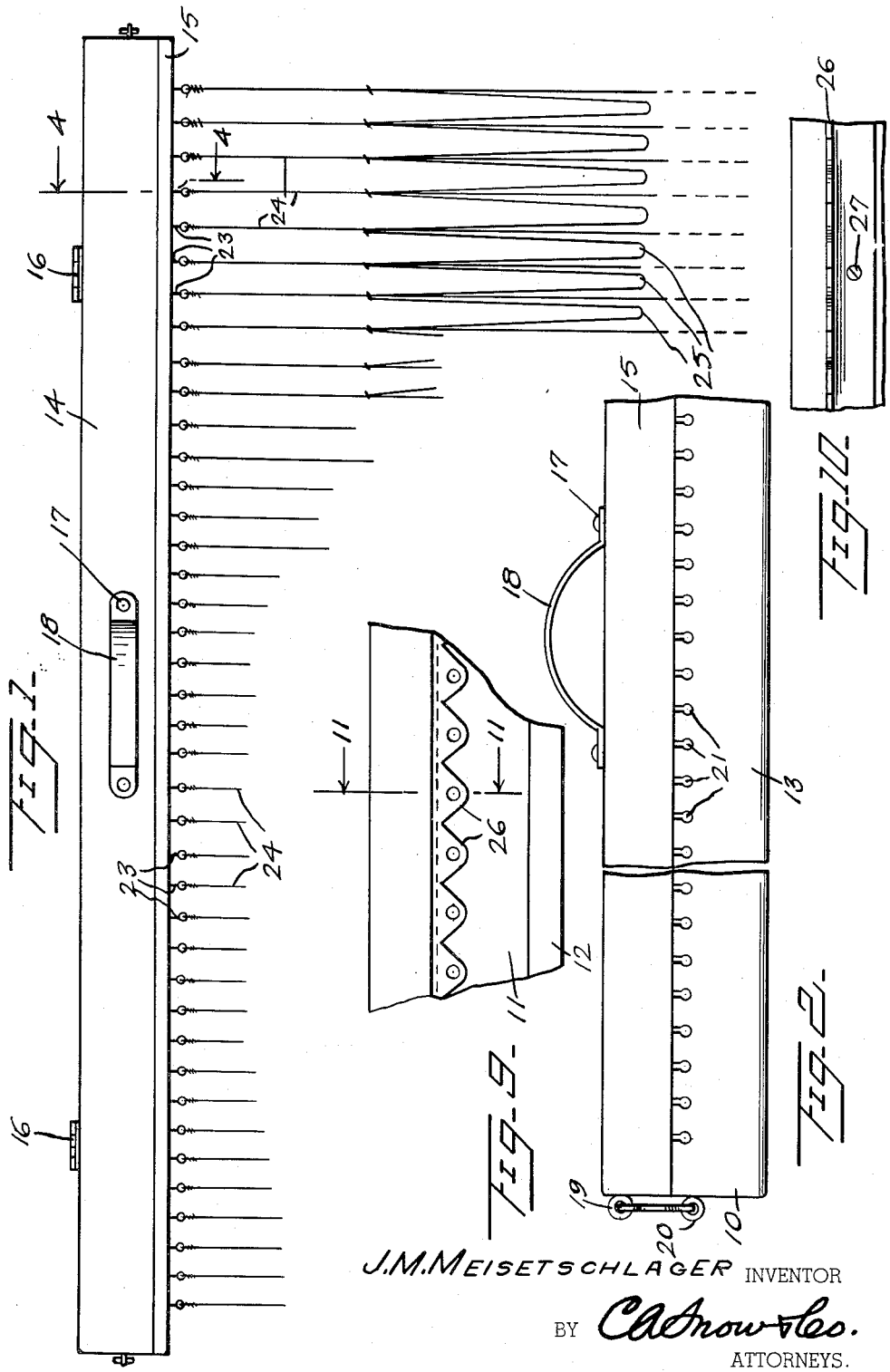
J.M. MEISETSCHLAGER INVENTOR
BY CA Snow &Co.
ATTORNEYS.

March 13, 1962
J. M. MEISETSCHLAGER
3,024,563
CASE FOR FISHING LINES
Filed Aug. 20, 1959
2 Sheets-Sheet 2
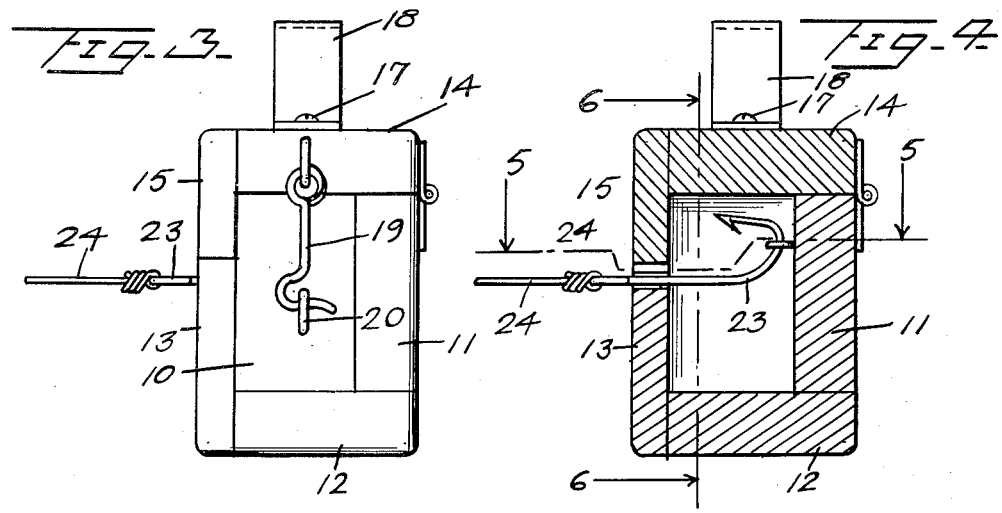
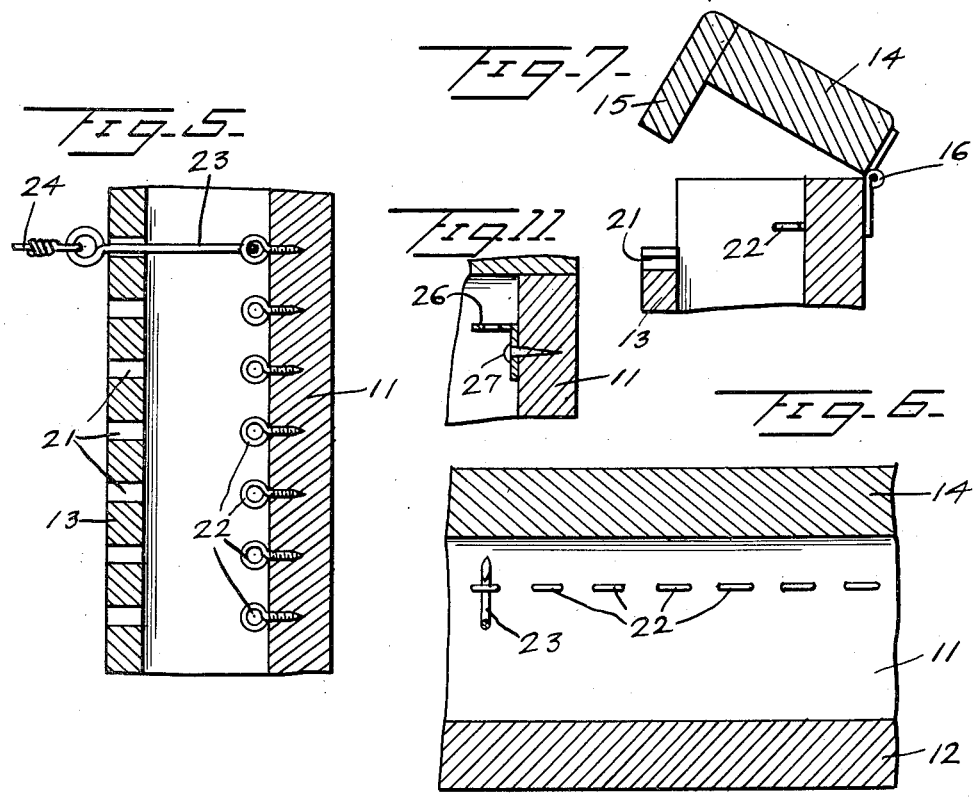
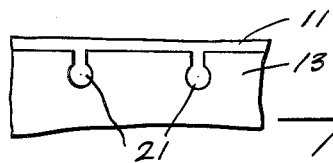
J.M. MEISETSCHLAGER
INVENTOR
BY C.A. Snow & Co.
ATTORNEYS.

United States Patent Office 3,024,563
Patented Mar. 13, 1962

3,024,563
CASE FOR FISHING LINES
Joe M. Meisetschlager, 218½ N. Oak St.,
Mineral Wells, Tex.
Filed Aug. 20, 1959, Ser. No. 835,006
1 Claim. (Cl. 43—54.5)

This invention relates to a case for fishing lines.

The object of the present invention is to provide a compact case for carrying fishing lines to and from fishing spots.

Another object of the present invention is to provide a case for carrying fishing lines which provides for the lines being carried without becoming matted or the hooks thereon becoming entangled.

Still other objects, advantages and improvements will become apparent from the following specification, taken in connection with the accompanying drawings, in which:

FIGURE 1 is a top plan view of a carrying case according to the present invention, showing the fishing lines extending from same.

FIG. 2 is an end view of the carrying case, showing the lid closed.

FIG. 3 is an end elevational view, showing the carrying case according to FIG. 2.

FIG. 4 is a sectional view, on the section line 4 of FIG. 1 and looking in the direction of the arrows, and showing one of the hooks engaged in the holding means.

FIG. 5 is a sectional view taken on the section line 5—5 of FIG. 4 and looking in the direction of the arrows, and also showing one of the hooks engaged in the holding means, FIG. 6 is a vertical sectional view, taken on the line 6—6 of FIG. 4 and looking in the direction of the arrows, showing the inner rear wall of the case and the holding means thereon and one of the hooks engaged in the latter, FIG. 7 is a vertical sectional view similar to FIG. 4, but showing the lid in raised position and also one form of the hook holding means on the rear wall of the case.

FIG. 8 is a fragmentary front elevational view showing the hook receiving slots in the front wall of the case.

FIG. 9 is a fragmentary top plan view showing the inner rear wall of the case with a modified form of the holding means for the hooks mounted thereon.

FIG. 10 is a fragmentary elevational view showing the rear wall of the case and the hook holding means, according to FIG. 10, mounted thereon.

FIG. 11 is a vertical sectional view, taken on the section line 11—11 of FIG. 10, and also showing the modified form of hook holding means, according to FIG. 9, secured in the rear wall of the case.

Referring now to the drawings in detail, and to FIG. 3 in particular, the case according to the present invention is comprised principally by a pair of end walls 10—10, a rear wall 11, a bottom wall 12, and a front wall 13. The end walls 10—10 are preferably of rectangular shape. The rear wall 11 is flush with the top and bottom of the end walls 10—10. The bottom 12 is flush with the front sides of the ends 10—10 and the inner face of the rear wall 11. The front wall 13 is flush with the outer face of the bottom wall 12 and extends upwardly about three-quarters of the height of the rear wall 11.

The cover is formed by two parts 14 and 15, united in right angle relationship, the former being flush with the outer faces of the end walls 10—10 and the rear wall 11, and the latter complementing the front wall 13 to form a complete closure for the case when the top is down. The various parts of the case thus far described, are shown made of wood. However, sheet metal could as well be used. The rear wall 11 is secured to the end walls 10—10, the bottom wall 12 to the end walls 10—10 and the rear wall 11, the front wall 13 to the end walls 10—10 and the bottom wall 12, and the part 14 of the top to the part 15 of the latter, by nails or screws or by a suitable wood adhesive.

The top 14 is secured to the rear wall 11 by at least a pair of hinges 16—16. At approximately the mid-section of the top, there is secured a carrying handle 18, by screws 17. At the ends of the top 14 there are mounted hooks 19, which cooperate with eyes 20 in the end walls 10—10 to hold the top in the closed position.

As shown particularly in FIGS. 2, 5 and 8, at uniformly spaced intervals along the front wall 13, there are provided hook receiving apertures 21. These are of inverted key-hole shape, being comprised by circular openings through the front wall 13 positioned slightly below the top edge of the latter, intersected by slots, also through the front wall 13, of narrower width than the diameter of the circular openings and extending from the latter to the top edge of the front wall.

The hook receiving means according to the first modification, is best shown in FIGS. 4, 5, 6 and 7. This means consists of a line of screw eyes 22 on the inner face of the back wall 11 of the case. The screw eyes correspond in number to the hook receiving apertures 21 in the front wall 13 of the case, but the line of same is positioned slightly higher above the bottom wall 12 of the case than the circular portions of the apertures. Also, the screw eyes 22 may, if desired, be offset longitudinally of the center line of the apertures 21 in the front wall 13 of the case, to provide for the twist of the point of the hook relative to the plane of the shank.

FIGS. 5 and 6 show one of the hooks 23 with the shank resting in one of the apertures 21 in the front wall 13 of the case and its pointed end received in a screw eye 22 in the inner face of the rear wall 11 of the case. The lines 24 to which the hooks 23 are secured are shown in FIGS. 1, 3 and 5. Interconnecting lines in the form of loops, are shown at 25. These loops prevent any of the lines from getting lost, in case the corresponding hooks 23 should become detached from the screw eye 22; also they limit the transverse separation of one line from another.

In the modification according to FIG. 10 of the drawings, this longitudinally spaced row of screw eyes is replaced by a scalloped metal strip 26. Each scallop is rounded at its outer edge and holes are formed in the scallops at the centers of the rounded sections. These holes receive the pointed ends of the hooks 23 in the same manner as the screw eyes 22 in the previous modification. The strip 26 is held in place on the inner face of the rear wall 11 of the case, by screws 27.

The latter modification has several advantages over the modification according to FIGS. 4, 5, 6 and 7. The strip 26 can be fabricated on a punch press alone, or first on a punch press, then on a forming press and a drill press in any length desired. Less labor is involved in installing the strip 26 with two or three screws than a plurality of screw eyes. There is no horizontal alignment problem with the continuous metal strip, as there is with the plurality of screw eyes.

The use of the case according to the present invention is believed to be obvious. The hooks 23 are engaged with their pointed ends in the holding means, either the screw eyes 22 or the scalloped metal strip 26, and their shanks in the slots 21 in the front wall 13 of the case. The lines 24 are then laid out in parallel relation, as shown in FIG. 1. They may then be wrapped around the case for carrying to or from the fishing spot. When finished fishing, the lines may be laid out in parallel relation again, as shown in FIG. 1, for drying, before being wrapped around the case.

Having now fully described my invention, what I claim as new and useful and desire to be secured by Letters Patent of the United States is:

A carrying case for fishing lines having a bottom, a rear wall and a front wall of lesser height than the rear wall, a scalloped and punched hook receiving metal strip extending inwardly from the rear wall for engaging the bights of the pointed ends of fishing hooks, said front wall having circular openings intersected by open ended slots extending from the top edge of the front wall, disposed opposite to said means for holding the pointed end of fish hooks, a cover hingedly connected at its rear edge to the upper edge of said rear wall, and a depending strip formed along the front edge of said cover of a thickness equal to the thickness of said front wall and movable to seat on the top of said front wall to close the open ends of said slots closing said slots against accidental displacement of hooks held therein.

References Cited in the file of this patent

UNITED STATES PATENTS

| | | |
|---|---|---|
| 2,580,912 | Hawthorne | Jan. 1, 1952 |
| 2,629,964 | Thunell | Mar. 3, 1953 |
| 2,801,492 | Katwyk et al. | Aug. 6, 1957 |
| 2,846,806 | Gaines | Aug. 12, 1958 |

FOREIGN PATENTS

| | | |
|---|---|---|
| 63,949 | Norway | Sept. 22, 1941 |
| 225,941 | Switzerland | June 16, 1943 |
| 1,109,738 | France | Sept. 28, 1955 |